United States Patent
Hara et al.

(10) Patent No.: US 7,595,893 B2
(45) Date of Patent: Sep. 29, 2009

(54) SHAPE MEASUREMENT METHOD AND SHAPE MEASUREMENT APPARATUS

(75) Inventors: Sotomitsu Hara, Tsukuba (JP); Yutaka Tsuchida, Tsukuba (JP); Yoshikazu Arai, Sendai (JP); Yasushi Ishii, Mitaka (JP); Makoto Abe, Tsukuba (JP); Yasushi Ueshima, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 94 days.

(21) Appl. No.: 11/898,865

(22) Filed: Sep. 17, 2007

(65) Prior Publication Data

US 2008/0068608 A1    Mar. 20, 2008

(30) Foreign Application Priority Data

Sep. 20, 2006   (JP)   ............................. 2006-253976
Sep. 20, 2006   (JP)   ............................. 2006-253983

(51) Int. Cl.
*G01B 11/30*    (2006.01)
*G01B 11/24*    (2006.01)

(52) U.S. Cl. ...................................... 356/601; 356/613
(58) Field of Classification Search .......... 356/600–640
See application file for complete search history.

(56) References Cited

U.S. PATENT DOCUMENTS

| | | | |
|---|---|---|---|
| 3,761,182 A * | 9/1973 | Kubisiak et al. | 356/639 |
| 3,947,129 A * | 3/1976 | Wiklund | 356/638 |
| 4,260,260 A * | 4/1981 | Letort et al. | 356/638 |
| 4,399,361 A * | 8/1983 | Zanzucchi et al. | 250/343 |
| 4,895,449 A * | 1/1990 | Marshall | 356/638 |
| 5,077,477 A * | 12/1991 | Stroman et al. | 250/349 |
| 5,091,862 A * | 2/1992 | Hoffman et al. | 702/40 |
| 5,264,909 A * | 11/1993 | Rochester | 356/73.1 |
| 5,278,634 A | 1/1994 | Skunes et al. | |
| 5,280,170 A | 1/1994 | Baldwin | |
| 5,345,081 A * | 9/1994 | Rogers | 250/338.1 |
| 5,699,161 A * | 12/1997 | Woodworth | 356/628 |
| 6,345,114 B1 * | 2/2002 | Mackie et al. | 382/132 |
| 6,700,671 B2 * | 3/2004 | Akishiba | 356/638 |
| 2006/0140470 A1 | 6/2006 | Watanabe | |
| 2006/0185550 A1 * | 8/2006 | Zanzucchi et al. | 101/484 |

FOREIGN PATENT DOCUMENTS

| | | |
|---|---|---|
| JP | A-2000-155013 | 6/2000 |
| JP | A-2005-096033 | 4/2005 |
| WO | WO 92/14988 A1 | 9/1992 |

\* cited by examiner

*Primary Examiner*—Gregory J Toatley, Jr.
*Assistant Examiner*—Jarreas C Underwood
(74) *Attorney, Agent, or Firm*—Oliff & Berridge, PLC

(57) ABSTRACT

A shape measurement method for measuring a shape of an object to be measured, which has a substantially rotating symmetric shape, includes: placing an aperture having an opening larger than an outer shape of the object to be measured and the object to be measured on an optical axis; taking an image generated by light projected to the object to be measured, by using an image pickup unit; and calculating one cross-sectional shape of the object to be measured based on a light intensity distribution of the image taken by the image pickup unit.

23 Claims, 15 Drawing Sheets

SHAPE MEASUREMENT METHOD AND SHAPE MEASUREMENT APPARATUS

BACKGROUND OF THE INVENTION

1. Field of the Invention

The present invention relates to a shape measurement method and a shape measurement apparatus.

2. Description of the Related Art

Conventionally, as a probe for a three-dimensional coordinate measuring machine or the like, a probe having a bar-like shaft and a contacting sphere provided at a tip end of the shaft has been used. A probe processing method and a probe processing apparatus for processing a probe having a fine tip sphere providing a high measurement sensitivity, have been known (see Patent Publication 1).

[Patent Publication 1] Published Japanese Patent Application No. 2005-96033

However, in the above conventional technique, although it is possible to process a probe having a fine tip sphere, it is difficult to measure the sphericity of a fine tip sphere. Thus, the measurement of the sphericity of a tip sphere is a key to provide a fine probing system having higher accuracy, which is expected to be developed in the future.

SUMMARY OF THE INVENTION

An object of the present invention is to provide a shape measurement method and a shape measurement apparatus in which a shape can be easily and efficiently measured.

In accordance with a first aspect of the invention, a shape measurement method for measuring a shape of an object to be measured, which has a substantially rotating symmetric shape, comprises:

placing an aperture having an opening larger than an outer shape of the object to be measured and the object to be measured on an optical axis;

taking an image generated by light projected to the object to be measured, by using an image pickup unit; and calculating one cross-sectional shape of the object to be measured based on a light intensity distribution of the image taken by the image pickup unit.

In accordance with the second aspect of the invention, a shape measurement method for measuring a shape of an object to be measured, which has a substantially rotating symmetric shape, comprises:

placing the object to be measured, a first lens, an aperture which has an opening larger than an outer shape of the object to be measured and which is disposed at an imaging position of the first lens, and a second lens between a light source unit and an image pickup plane of an image pickup unit, on an optical axis in an order of the object to be measured, the first lens, the aperture and the second lens from the light source unit;

taking an image generated by light projected from the light source unit to the object to be measured, by using the image pickup unit; and calculating one cross-sectional shape of the object to be measured based on a light intensity distribution of the image taken by the image pickup unit.

In accordance with the third aspect of the invention, a shape measurement method for measuring a shape of an object to be measured, which has a substantially rotating symmetric shape, comprising:

placing an aperture having an opening larger than an outer shape of the object to be measured, a first lens, the object to be measured which is disposed at an imaging position of the first lens, and a second lens between a light source unit and an image pickup plane of an image pickup unit, on an optical axis in an order of the aperture, the first lens, the object to be measured and the second lens from the light source unit;

taking an image generated by light projected from the light source unit to the object to be measured, by using the image pickup unit; and calculating one cross-sectional shape of the object to be measured based on a light intensity distribution of the image taken by the image pickup unit.

In accordance with the fourth aspect of the invention, a shape measurement apparatus for measuring a shape of an object to be measured, which has a substantially rotating symmetric shape, comprises:

a light source unit for projecting light to the object to be measured;

an aperture which is placed on an optical axis of the light outputted from the light source unit and which has an opening larger than an outer shape of the object to be measured;

an image pickup unit for taking an image obtained by projecting the light from the light source to the object to be measured, which is placed on the optical axis; and a cross-sectional shape calculation unit for calculating one cross-sectional shape of the object to be measured based on a light intensity distribution of the image taken by the image pickup unit.

In accordance with the fifth aspect of the invention, a shape measurement apparatus for measuring a shape of an object to be measured, which has a substantially rotating symmetric shape, comprises:

a light source unit for projecting light to the object to be measured;

a first lens and a second lens for passing an image of the object to be measured, which is obtained by the light projected from the light source;

an aperture which is placed at an imaging position between the first lens and the second lens and which has an opening larger than an outer shape of the object to be measured;

an image pickup unit for taking the image passed by the second lens; and a cross-sectional shape calculation unit for calculating one cross-sectional shape of the object to be measured based on a light intensity distribution of the image taken by the image pickup unit.

In accordance with the sixth aspect of the invention, a shape measurement apparatus for measuring a shape of an object to be measured, which has a substantially rotating symmetric shape, comprises:

a light source unit for projecting light to the object to be measured;

an aperture which has an opening larger than an outer shape of the object to be measured and which passes the light outputted by the light source unit from the opening;

a first lens and a second lens for passing the light passed by the aperture;

an image pickup unit which is provided on an opposite side of the first lens with respect to the second lens and which takes an image of the object to be measured, which is disposed at an imaging position of the first lens between the first lens and the second lens; and a cross-sectional calculation unit for calculating one cross-sectional shape of the object to be measured based on a light intensity distribution of the image taken by the image pickup unit.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

DETAILED DESCRIPTION OF THE PREFERRED EMBODIMENTS

Hereinafter, a shape measurement method and a shape measurement apparatus according to the present invention will be described with reference to the drawings. In the embodiments, the shape measurement method and the shape measurement apparatus are explained by exemplifying a sphere as an object to be measured.

Embodiment 1

Figure 1:
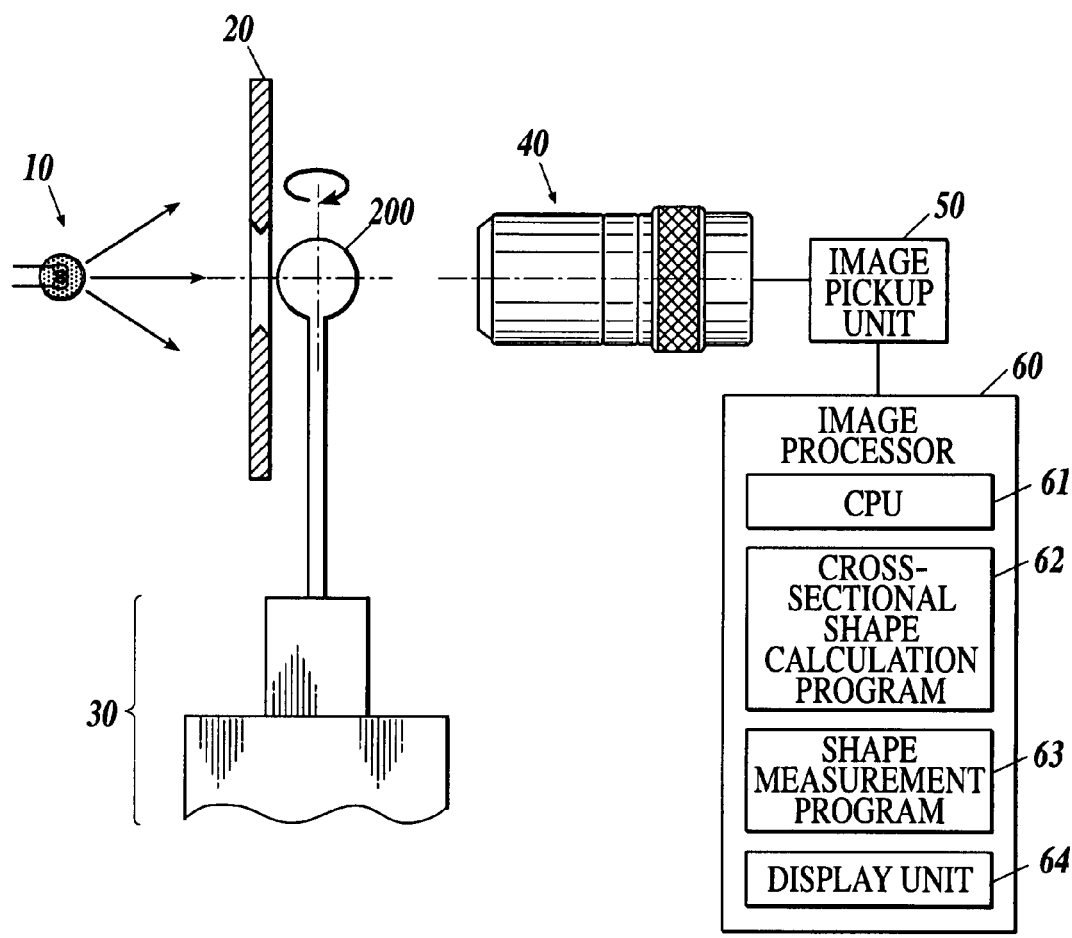
FIG. 1 is a schematic view illustrating the structure of a shape measurement apparatus in Embodiment 1 according to the present invention.

As shown in FIG. 1, a shape measurement apparatus 100 in Embodiment 1 includes a light source unit 10, an aperture 20, a rotating mechanism 30 for rotating and supporting an object 200 to be measured; a magnifying lens 40; an image pickup unit 50; and an image processor 60. Along the optical axis of light outputted from the light source unit 10, the aperture 20, the object 200 to be measured, the magnifying lens 40, and the image pickup unit 50 are arranged in this order.

The light source unit 10 uses a point light source for emitting white light for example as shown in FIG. 1 and projects white light to the object 200 to be measured. It is noted that the light source unit 10 is not limited to such a point light source and also may be a surface light source or also may emit light by a discharge lamp, a light-emitting diode, or laser.

Figure 2:
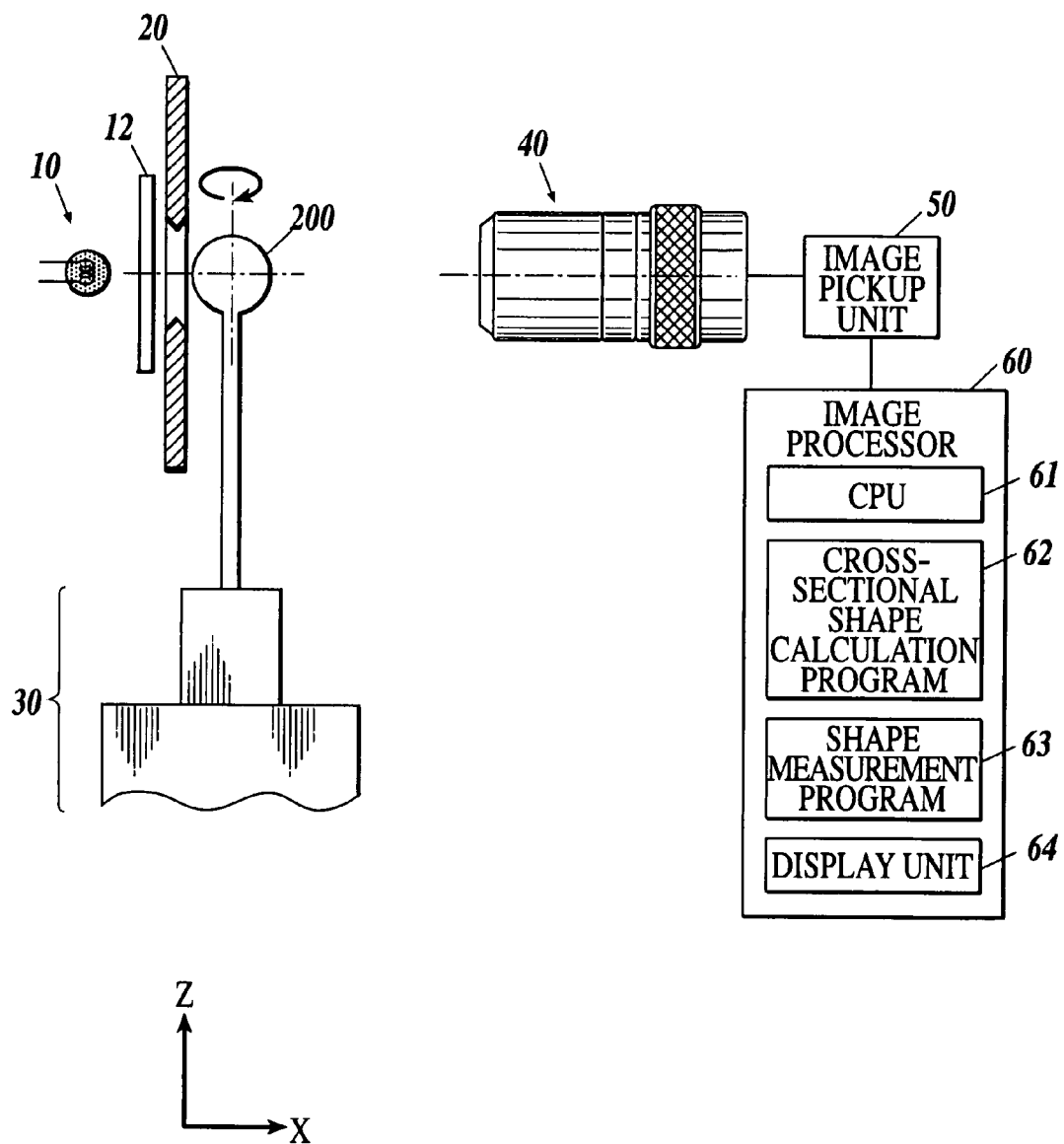
FIG. 2 is a schematic view illustrating a structure in which a diffuser plate is used for the shape measurement apparatus according to the present invention.

As shown in FIG. 2, the light source unit 10 also can include a diffuser plate 12 as a diffusing unit between a point light source and the aperture 20 (which will be described later). The white light outputted from the point light source can be diffused through the diffuser plate 12 as described above.

Figure 3:
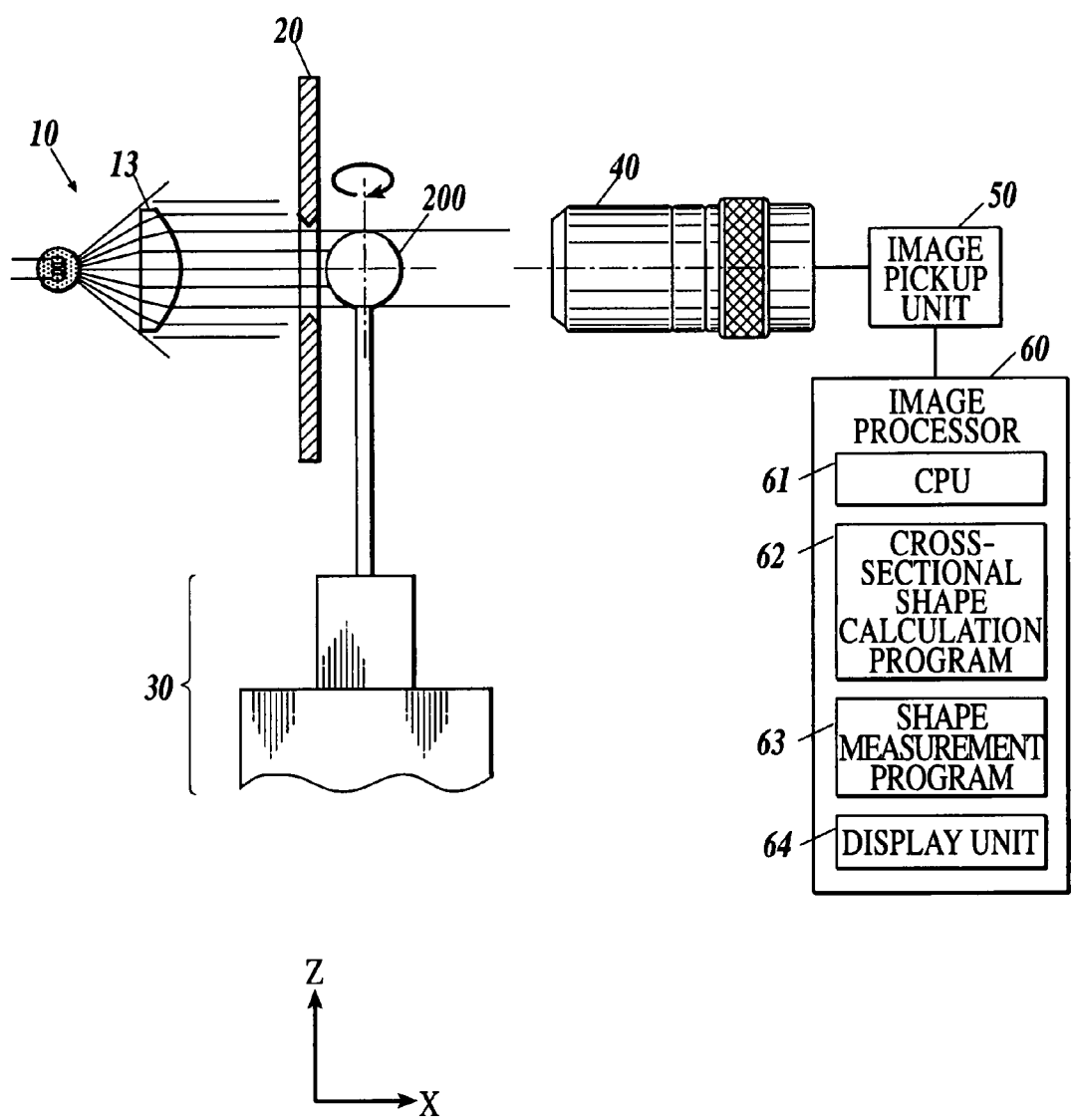
FIG. 3 is a schematic view illustrating a structure in which a collimator lens is used for the shape measurement apparatus according to the present invention.

As shown in FIG. 3, the light source unit 10 also can include a collimate lens 13 as a collimation unit between a point light source and the aperture 20 (which will be described later). The white light emitted from the point light source can be converted to collimated light through the collimate lens 13 as described above.

Figure 4A:
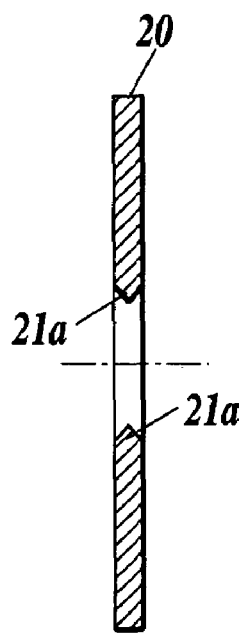
FIG. 4A is a front view illustrating an aperture according to the present invention.
Figure 4B:
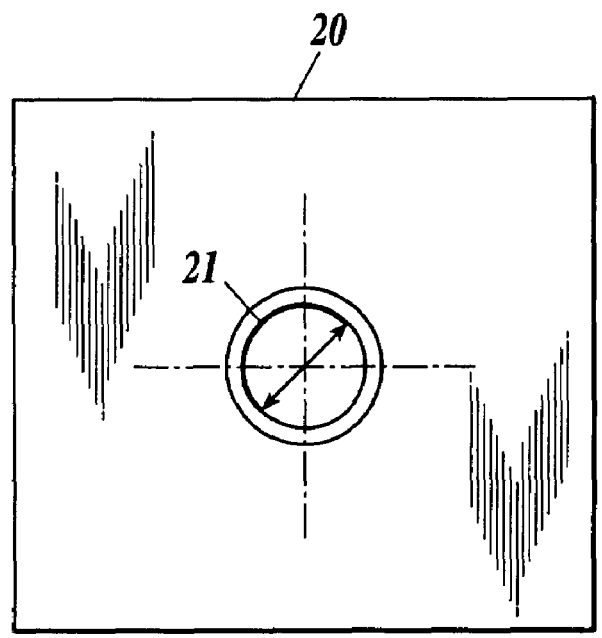
FIG. 4B is a cross-sectional view illustrating an aperture according to the present invention.

The aperture 20 has a substantially rectangular flat plate-like shape as shown in FIG. 4 for example. The aperture 20 has an opening 21 larger than an outer shape of the object 200 to be measured. The aperture 20 is placed so that the optical axis of the light source unit 10 penetrates the center of the opening 21 described above. The opening 21 has a substantially similar figure as one cross-sectional shape of the object 200 to be measured.

More specifically, when the object 200 to be measured is a sphere having a diameter of 50 μm, as shown in FIG. 4, the aperture 20 has a circular opening 21 having an inner diameter in a range from about 52 μm to about 55 μm.

Although the thickness of the aperture 20 is a design matter, the thickness of the aperture 20 is preferably thinner in order to reduce the diffusion of light at an inner wall face of the opening 21 of the aperture 20.

An inner wall section 21a forming the opening 21 of the aperture 20 has a knife edge-like cross-sectional shape as shown in FIG. 4A. Therefore, it is possible to reduce the diffusion of the light outputted from the light source unit 10 to the opening 21 at the inner wall face to suppress the diffraction of light.

Figure 5:
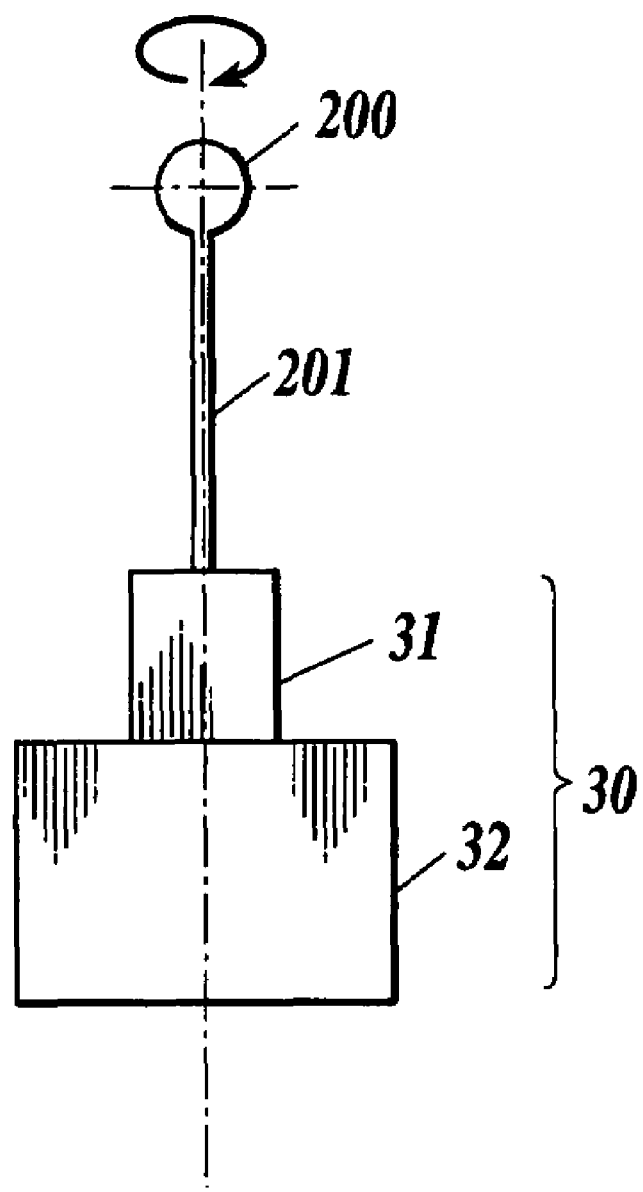
FIG. 5 is a schematic view illustrating a state in which a rotating mechanism according to the present invention is attached to an object to be measured.

As shown in FIG. 5, the rotating mechanism 30 comprises a retention section 31 and a spindle 32 for example.

The retention section 31 retains a shaft 201 integrated with the object 200 to be measured. As a structure for retaining the shaft 201, for example, a collet chuck is used. It is noted that the retention section 31 is formed so that the center of the object 200 to be measured is placed on the extended line of the rotation axis of the shaft 201 integrated with the object 200 to be measured.

The spindle 32 is connected to the retention section 31 and rotates the object 200 to be measured by using a shaft center perpendicular to the optical axis of the light source unit 10 as a rotation shaft for example. The spindle 32 controls the rotation angle by an encoder (not shown) for example.

The rotating mechanism 30 is structured so that the object 200 to be measured can be moved in axis X, axis Y, and axis Z directions while the object 200 to be measured is retained by the retention section 31. Therefore, it is possible to place the center of the object 200 to be measured at the center of the opening 21 of the aperture 20.

By including the retention section 31 and the spindle 32 as described above, the rotating mechanism 30 functions as a rotation unit.

As shown in FIG. 1, the magnifying lens 40 is placed on the optical axis of light outputted from light source unit 10 between the aperture 20 (or the object 200 to be measured) and an image pickup plane of the image pickup unit 50 (which will be described later) for example.

The image pickup unit 50 uses a CCD camera as an image pickup unit for example and takes an image through the magnifying lens 40.

Figure 6:
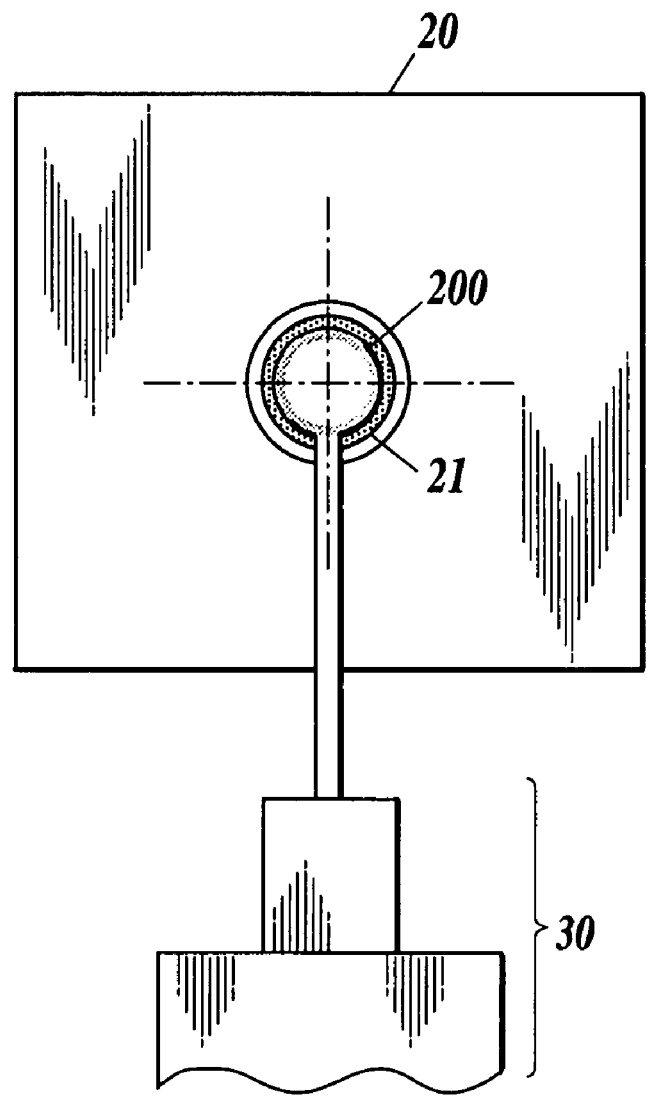
FIG. 6 is a view illustrating a state in which when the light is outputted from a light source unit in Embodiment 1 according to the present invention, an object to be measured is irradiated via an aperture.

Specifically, as shown in FIG. 6, a circle of light caused when light outputted from the light source unit 10 is projected to the object to be measured via the aperture 20 is taken through the magnifying lens 40.

The image pickup unit 50 functions as an image pickup unit by using the CCD camera to take an image.

As shown in FIG. 1, the image processor 60 comprises a CPU 61; a cross-sectional shape calculation program 62; a shape measurement program 63; and a display unit 64 for showing an image processing result for example.

The image processor 60 processes an image taken by the image pickup unit 50. The CPU 61 executes the cross-sectional shape calculation program 62 to calculate one cross-sectional shape of the object 200 to be measured based on the light intensity distribution of the processed image.

Specifically, one cross-sectional shape of a sphere as an object to be measured is calculated, for example, by collecting a light intensity pattern of an image taken by the image pickup unit 50 in the orthogonal coordinate axis system to determine a temporary center of one cross-sectional shape and a temporary center of the aperture and by detecting the edge of the bright point in a predetermined azimuthal direction when the temporary center of one cross-sectional shape and the temporary center of the aperture are origin, to detect the edge of the sphere and the edge of the aperture 20. Then, one cross-sectional shape of the sphere is calculated by comparing a shape of the opening 21, which is calculated from the detected edge of the aperture with the shape of the opening 21 of the aperture 20.

Figure 14:
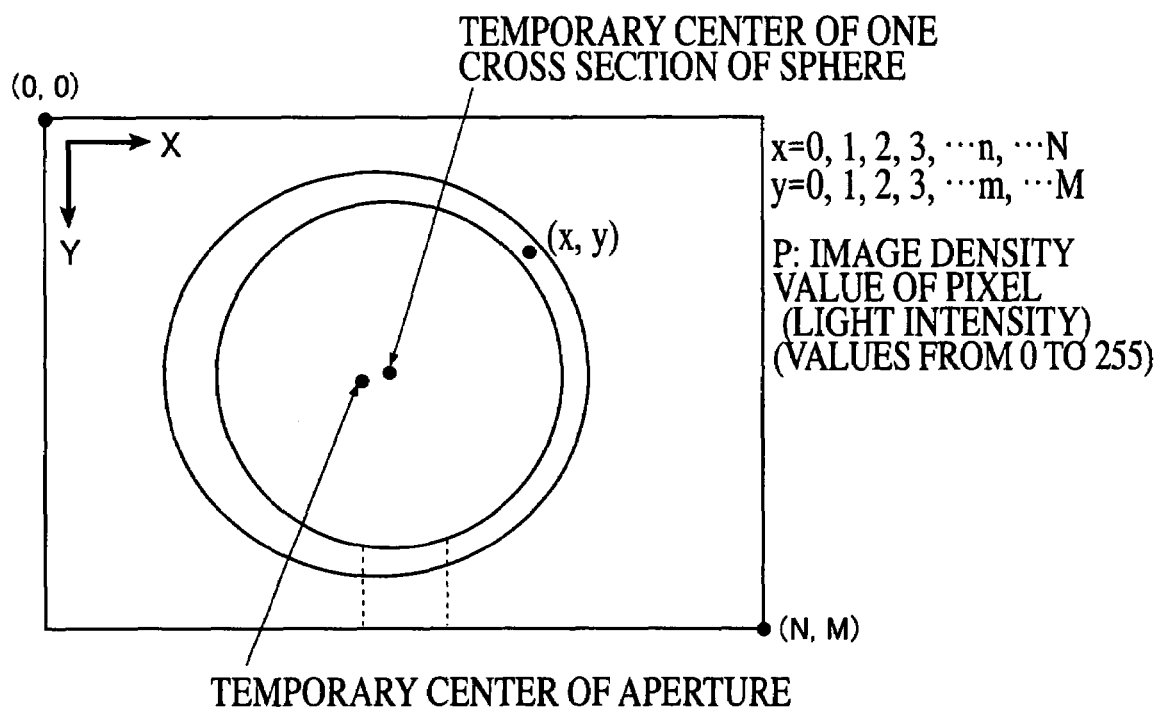
FIG. 14 illustrates a light intensity pattern of an image taken by an image pickup unit according to the present invention.

More specifically, for example, as shown in FIG. 14, the grayscale image of the image taken by the image pickup unit 50 is binarized to detect the boundary of the inner circle and the boundary of the outer circle. The center of the least square circle is calculated from the position of the boundary of the inner circle (aggregate of the pixel positions on the image). The center is treated as the temporary center of one cross section of the sphere. Similarly, the temporary center of the aperture 20 is calculated from the boundary of the outer circle.

Figure 15:
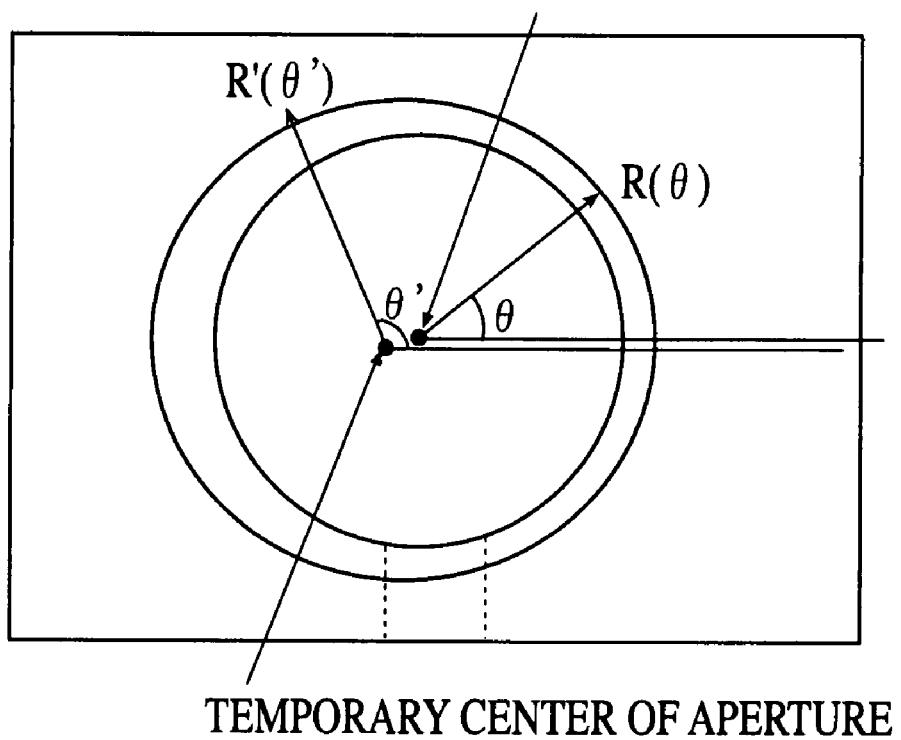
FIG. 15 illustrates a process for introducing the edge of one cross section of the sphere in the predetermined angle $\theta$ direction, that is, a radius $R(\theta)$, and the edge of the aperture in the predetermined angle $\theta'$ direction, that is, a radius $R'(\theta')$ based on the light intensity pattern of the image taken by the image pickup unit according to the present invention.

Next, for example, as shown in FIG. 15, in an original grayscale image, the edge of the sphere and the edge of the aperture 20 are detected from the temporary center of one cross section of the sphere and the temporary center of the aperture 20 by using the differentiation or the like by each predetermined angle. FIG. 15 illustrates a process for introducing the edge of one cross section of the sphere in the predetermined angle θ direction, that is, a radius $R(\theta)$, and the edge of the aperture 20 in the predetermined angle θ' direction, that is, a radius $R'(\theta')$.

Then, the center of the least square circle of one cross section of the sphere and that of the aperture 20 are calculated from the detected edge of the sphere and that of aperture 20. The edge of the sphere and the edge of the aperture 20 are detected from the center of one cross section of the sphere and the center of the aperture 20 by using the differentiation or the like by each predetermined angle, again.

Next, by comparing the shape of the opening 21, which is calculated from the detected edge of the aperture 20 with the shape of the opening 21 of the aperture 20, the shape of the opening 21, which is calculated from the detected edge of the aperture 20, is corrected. One cross-sectional shape of the sphere is calculated by correcting a shape of the detected edge of the sphere based on the amount of the above correction. Further, based on the calculated one cross-sectional shape, the roundness of the one cross section of the sphere is calculated.

The CPU 61 functions as a cross-sectional shape calculation unit by executing the cross-sectional shape calculation program 62 as described above.

Whenever the object 200 to be measured as a sphere is rotated by a predetermined angle by the rotating mechanism 30, one cross-sectional shape of the object 200 to be measured is calculated at each rotation angle. When the CPU 61 executes the shape measurement program 63, the cross-sectional shape in the entire surface of the sphere is calculated, that is, the three dimensional shape (variation) of the sphere is calculated.

Specifically, as described above, by comparing the shape of the opening 21, which is calculated from the edge of the aperture 20 with the shape of the opening 21 of the aperture 20, the shape of the opening 21, which is calculated from the edge of the aperture 20, is corrected. One cross-sectional shape of the sphere is calculated by correcting a shape of the detected edge of the sphere based on the amount of the above correction. Further, based on the calculated one cross-sectional shape, the roundness of the one cross section of the sphere is calculated.

Then, the above-described roundness is calculated at a predetermined rotation angle in the entire surface of the sphere. The sphericity of the sphere is calculated based on variation of values of the roundness.

The CPU 61 functions as a shape measurement unit by executing the shape measurement program 63 as described above.

Next, a method for measuring the shape of the object 200 to be measured by the shape measurement apparatus 100 in Embodiment 1 will be described.

First, as shown in FIG. 1, the optical axis and the aperture 20 are arranged so that the optical axis is perpendicular to the plane of the aperture 20. The aperture 20 and the object 200 to be measured are arranged so that the center of the opening 21 of the aperture 20 is coincident with the center of the object 200 to be measured on the optical axis.

Then, the aperture 20 is preferably placed in the vicinity of the object 200 to be measured.

Next, as shown in FIG. 3, the collimate lens 13 for converting light outputted from the light source unit 10 to collimated light, is disposed between the light source unit 10 and the aperture 20 on the optical axis.

Next, on the optical axis of light outputted from light source unit 10, the magnifying lens 40 for magnifying an image is inserted between the aperture 20 (or the object to be measured) and the image pickup unit 50.

Next, for example, a step for calculating one cross-sectional shape of the sphere based on the light intensity distribution of the image taken by the image pickup unit 50 and a step of rotating the sphere having a shaft center as a rotating axis perpendicular to the optical axis of the light source unit 10 by a predetermined angle by rotating mechanism 30, are repeated to calculate the cross-sectional shape in the entire surface of the sphere.

As described above, light outputted from the light source unit 10 can be outputted as collimated light by providing the collimate lens 13 between the light source unit 10 and the aperture 20 to project light to the object 200 to be measured. When light is projected to the object 200 to be measured, light can pass through the aperture 20 having an opening larger than the outer shape of the object 200 to be measured to emphasize the diffraction of light. Then, an image generated by projecting light from the light source unit 10 to the object 200 to be measured, which is placed on the optical axis, can be taken by the image pickup unit 50. Then, the CPU 61 can execute the shape measurement program 63 to calculate one cross-sectional shape of the object 200 to be measured based on the light intensity distribution of the taken image.

Thus, because the light emitted from the light source can be collected as collimated light, the entire diffraction pattern is bright and the contrast becomes higher. Further, a treatable diffraction pattern having a diffraction spread angle smaller than that of a point light source can be obtained. Thus, the shape of an object to be measured can be easily and efficiently measured.

Furthermore, by the rotating mechanism 30, it is possible to rotate the object 200 to be measured by a predetermined angle. Whenever the object 200 to be measured is rotated by a predetermined angle by the rotating mechanism 30, the CPU 61 can execute the cross-sectional shape calculation program 62 to calculate one cross-sectional shape of the object 200 to be measured and the CPU 61 can execute the shape measurement program 63 to calculate the cross-sectional shape in the entire surface of the object 200 to be measured.

Thus, it is possible to repeat the step of calculating one cross-sectional shape of the object to be measured and the step of rotating the object to be measured by a predetermined angle. Thus, the cross-sectional shape in the entire surface of the object to be measured can be easily and efficiently measured.

Furthermore, because the magnifying lens 40 for magnifying an image is provided between the aperture 20 (or the object 200 to be measured) and the image pickup unit 50, it is possible to easily and efficiently measure the shape of even a small object 200 to be measured.

Embodiment 2

Figure 7:
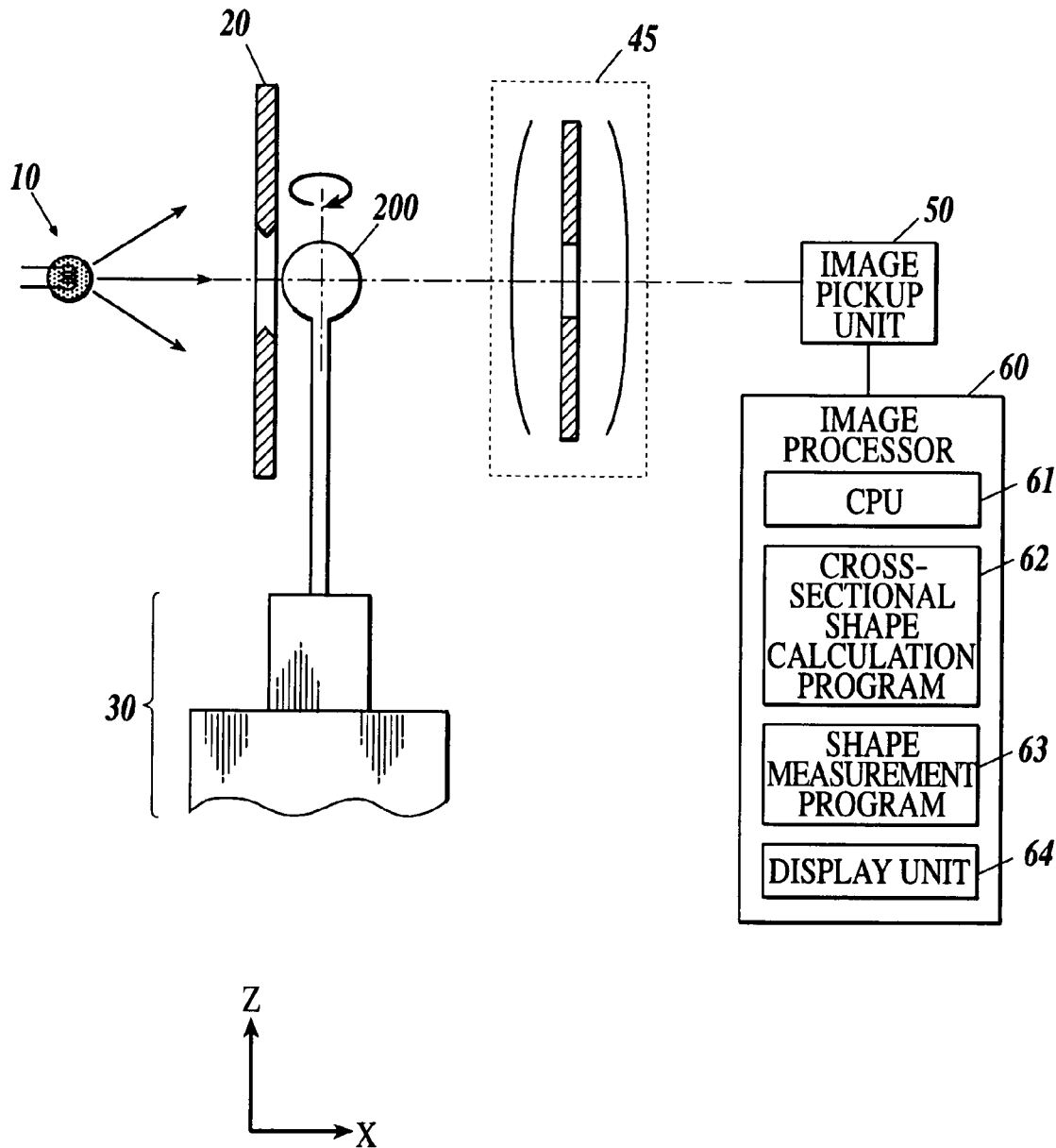
FIG. 7 is a schematic view illustrating the structure of a shape measurement apparatus in Embodiment 2 according to the present invention.

Next, Embodiment 2 of the shape measurement apparatus according to the present invention will be described with reference to FIG. 7. The basic structure of Embodiment 2 is the same as that of Embodiment 1. However, the structure of Embodiment 2 is different from that of Embodiment 1 in that the magnifying lens 40 is replaced with a telecentric lens 45.

According to the structure as described above, by the telecentric lens 45, it is possible to form an image by using only light parallel to the optical axis among light passing through the opening 21 of the aperture 20. Therefore, an error of the size of the image can be suppressed, and a more preferable shape measurement can be performed.

In Embodiment 2, a method for measuring the shape of the object 200 to be measured by the shape measurement apparatus 300 is the same as that of Embodiment 1.

Embodiment 3

Figure 8:
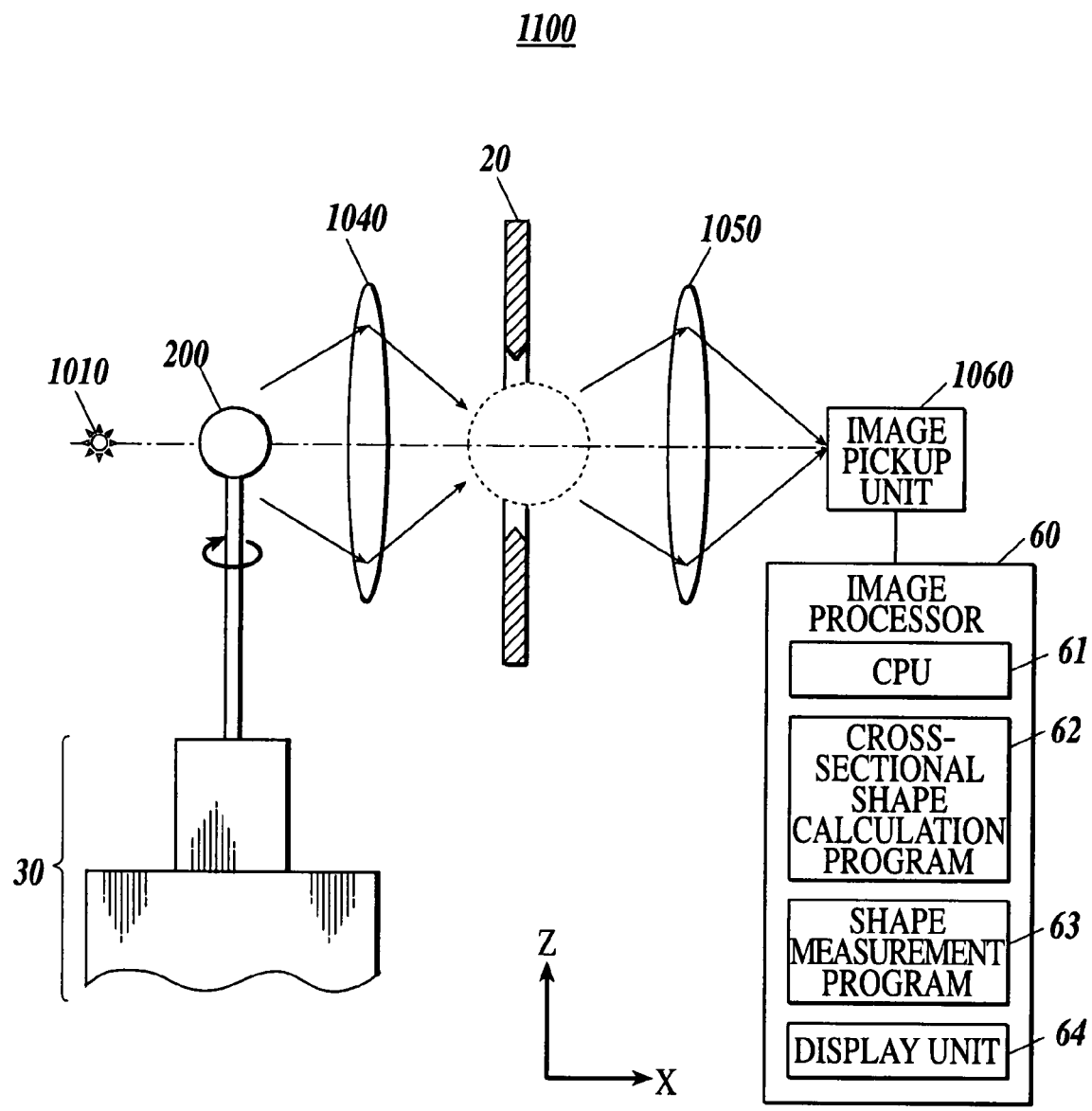
FIG. 8 is a schematic view illustrating the structure of a shape measurement apparatus in Embodiment 3 according to the present invention.

As shown in FIG. 8, a shape measurement apparatus 1100 in Embodiment 3 includes a light source unit 1010, the aperture 20, the rotating mechanism 30, an objective lens 1040 as the first lens, an objective lens 1050 as the second lens, an image pickup unit 1060, and the image processor 60. Along the optical axis of light outputted from the light source unit 1010, an object 200 to be measured, the objective lens 1040, the aperture 20, the objective lens 1050, and the image pickup unit 1060 are arranged in this order. It is noted that the same components as those of Embodiments 1 and 2 are denoted with the same reference numerals and only components different from those of Embodiments 1 and 2 will be described.

For example, as shown in FIG. 8, the light source unit 1010 uses a point light source outputting white light to project white light to the object to be measured 1200. It is noted that the light source unit is not limited to such a point light source and also may be a surface light source or also may emit light by a discharge lamp, a light-emitting diode, or laser.

As shown in FIG. 8, for example, the objective lens 1040 is provided between the object 200 to be measured and the aperture 20 on the optical axis of light outputted from the light source unit 1010 to magnify the image of the object 200 to be measured.

As shown in FIG. 8, for example, the objective lens 1050 is provided between the aperture 20 and the image pickup unit 1060 on the optical axis of light outputted from the light source unit 1010 to magnify the image of the aperture 20 and the image of the object 200 to be measured, which is magnified by the objective lens 1040.

In the image pickup unit 1060, for example, a CCD camera is used as an image pickup unit and takes the image through the objective lens 1050.

Figure 9:
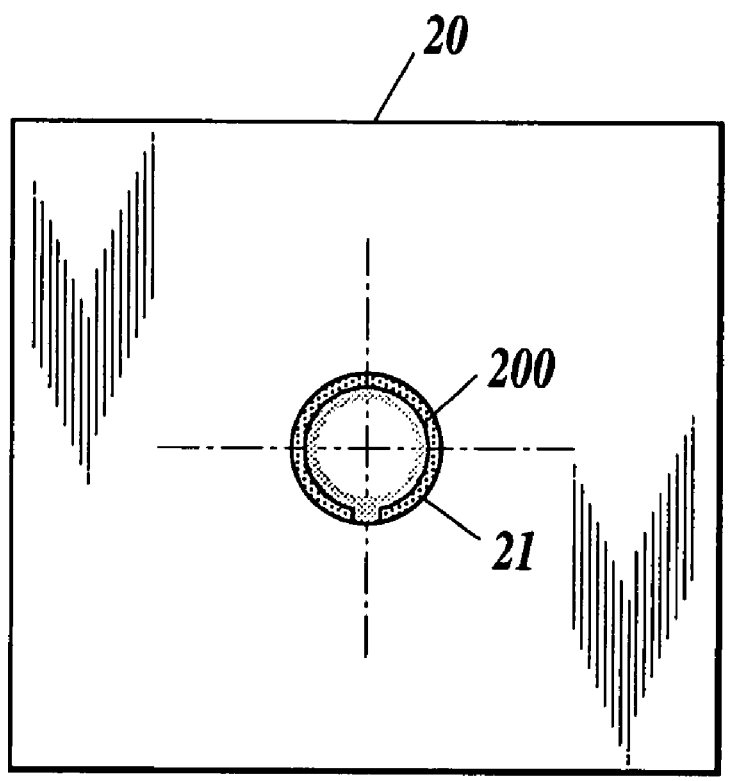
FIG. 9 is a view illustrating the light which can be seen through an aperture when the light is outputted from the light source unit in Embodiment 3 according to the present invention and an object to be measured is irradiated with the light.

Specifically, for example, as shown in FIG. 9, the object 200 to be measured is irradiated with the light outputted from the light source unit 1010. A circle of light generated via the aperture 20 is taken through the objective lens 1050.

The image pickup unit 1060 functions as an image pickup unit by using the CCD camera as described above to take the image.

Next, a method for measuring the shape of the object 200 to be measured in Embodiment 3 by the shape measurement apparatus 1100 will be described.

First, as shown in FIG. 8, the object 200 to be measured, the objective lens 1040, the aperture 20, and the objective lens 1050 are provided in this order from the light source unit 1010 side on the optical axis between the light source unit 1010 and the image pickup plane of the image pickup unit 1060. The diameter of the opening 21 of the aperture 20 is determined based on a magnification ratio at which the object 200 to be measured is magnified by the objective lens 1040. The aperture 20 is provided at a position at which the image of the object 200 to be measured is taken after the image passes through the objective lens 1040.

Next, light outputted from the light source unit 1010 passes through the opening 21 of the aperture 20 via the objective lens 1040. Then, a step of calculating one cross-sectional shape of the sphere via the objective lens 1050 based on the light intensity distribution of the image taken by the image pickup unit 1060 and a step of rotating the object 200 to be measured having a shaft center as a rotating axis perpendicular to the optical axis of the light source unit 1010 by a predetermined angle by the rotating mechanism 30, are repeated to calculate the cross-sectional shapes in the entire surface of the sphere which is the object 200 to be measured.

As described above, according to the shape measurement apparatus 1100 in Embodiment 3, by the light source unit 1010, it is possible to project light to the object 200 to be measured. The image of the object 200 to be measured, which is obtained by light outputted from the light source unit 1010 can pass through the objective lens 1040 and the objective lens 1050. When the light can be projected to the object 200 to be measured, the outline of the object to be measured is taken as an image by passing through the aperture 20 having an opening larger than the outer shape of the object 200 to be measured. By the image pickup unit 1060, the image outputted from the objective lens 1050 can be taken. By the cross-sectional calculation program 62 executed by the CPU 61, the shape of the object 200 to be measured can be calculated based on the light intensity distribution of the image taken by the image pickup unit 1060.

Therefore, based on the light intensity distribution of the taken circle of light, the edge of the object to be measured can be detected and the shape of the object to be measured can be easily and efficiently measured. Furthermore, the shape can be measured without depending on a distance between an object to be measured and an aperture. Therefore, it is possible to preferably prevent a physical interference between the object to be measured and the aperture. Furthermore, the size of an image of the object to be measured is determined by the magnification ratio of the objective lens 1040. Therefore, the freedom of the diameter of the opening of the aperture can be proportionally increased.

Furthermore, by the rotating mechanism 30, it is possible to rotate the object 200 to be measured by a predetermined angle. Whenever the object 200 to be measured is rotated by the predetermined angle by the rotating mechanism 30, the CPU 61 executes the cross-sectional shape calculation program 62 to calculate one cross-sectional shape of the object 200 to be measured. Then, the CPU 61 can execute the shape measurement program 63 to calculate the cross-sectional shape in the entire surface of the object 200 to be measured.

Thus, the step of calculating one cross-sectional shape of the object to be measured and the step of rotating the object to be measured by a predetermined angle can be repeated. Thus, the cross-sectional shape in the entire surface of an object to be measured can be easily and efficiently measured.

Embodiment 4

Figure 10:
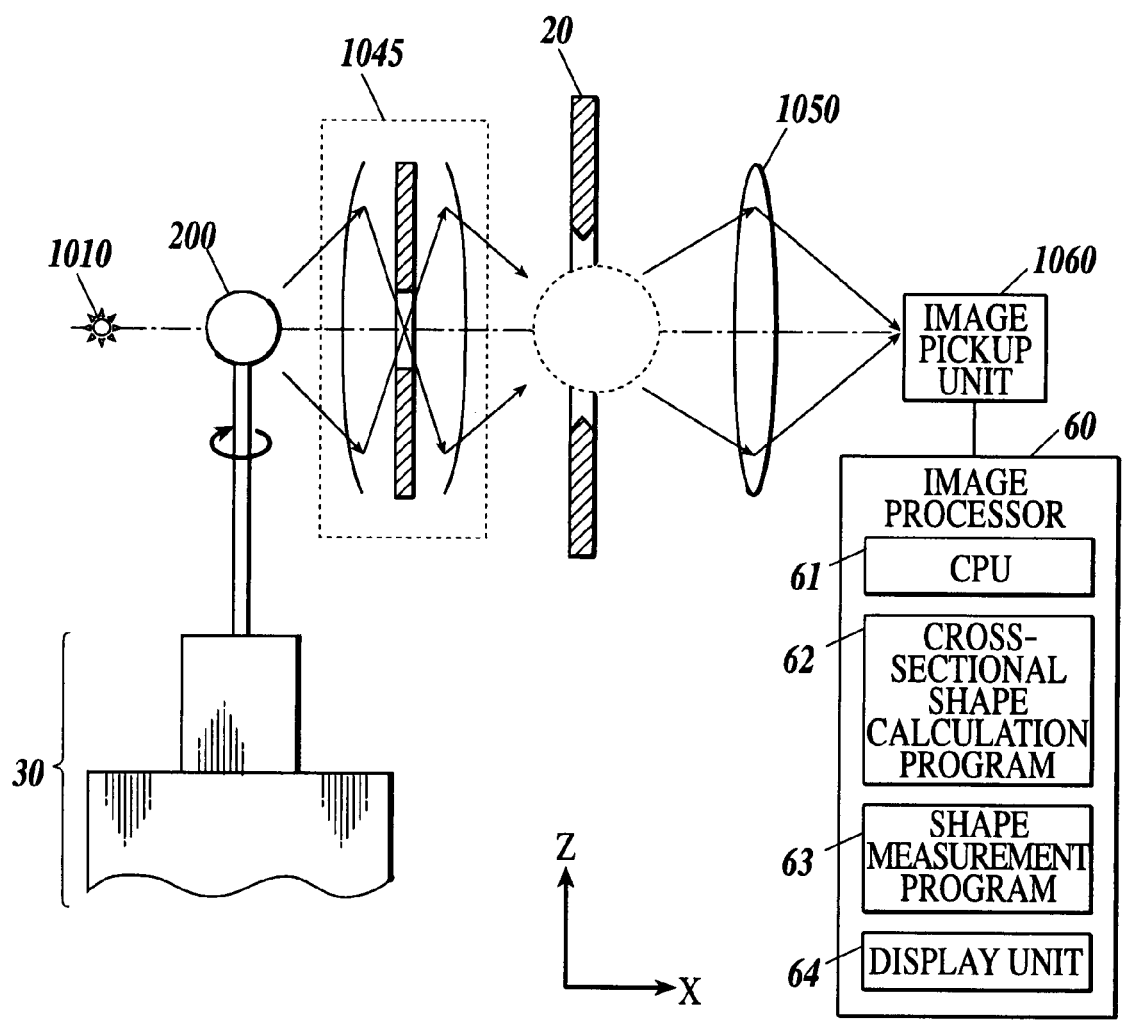
FIG. 10 is a schematic view illustrating the structure of a shape measurement apparatus in Embodiment 4 according to the present invention.

Next, Embodiment 4 of the shape measurement apparatus of the present invention will be described with reference to FIG. 10. The basic structure of Embodiment 4 is the same as that of Embodiment 3. However, the structure of Embodiment 4 is different from Embodiment 3 in that the first lens is a telecentric lens 1045.

According to the structure as described above, by using the telecentric lens, an aperture stop is disposed at the focal point of the lens. By reducing the aperture, much light from the object to be measured is blocked by the aperture stop. After the light forming an image enters the lens from the object to be measured in a direction substantially parallel to the optical axis, only light passing the focal point through the aperture stop is not blocked. Because an image is formed by using only the substantially collimated light from the object to be measured, the variation in the magnification ratio due to a change in the position of the object to be measured is small.

Therefore, it is possible to suppress a change in the magnification ratio due to the shift of the position of the object to be measured. Furthermore, when the object to be measured is rotated by the rotating mechanism, a change in the size of the image due to the shift of the position caused by a kinematic error can be suppressed. Furthermore, because the light diffraction can be reduced, a more preferable shape measurement can be performed.

In Embodiment 4, a method for measuring the shape of the object 200 to be measured by the shape measurement apparatus 1200 is the same as that of Embodiment 3.

Embodiment 5

Figure 11:
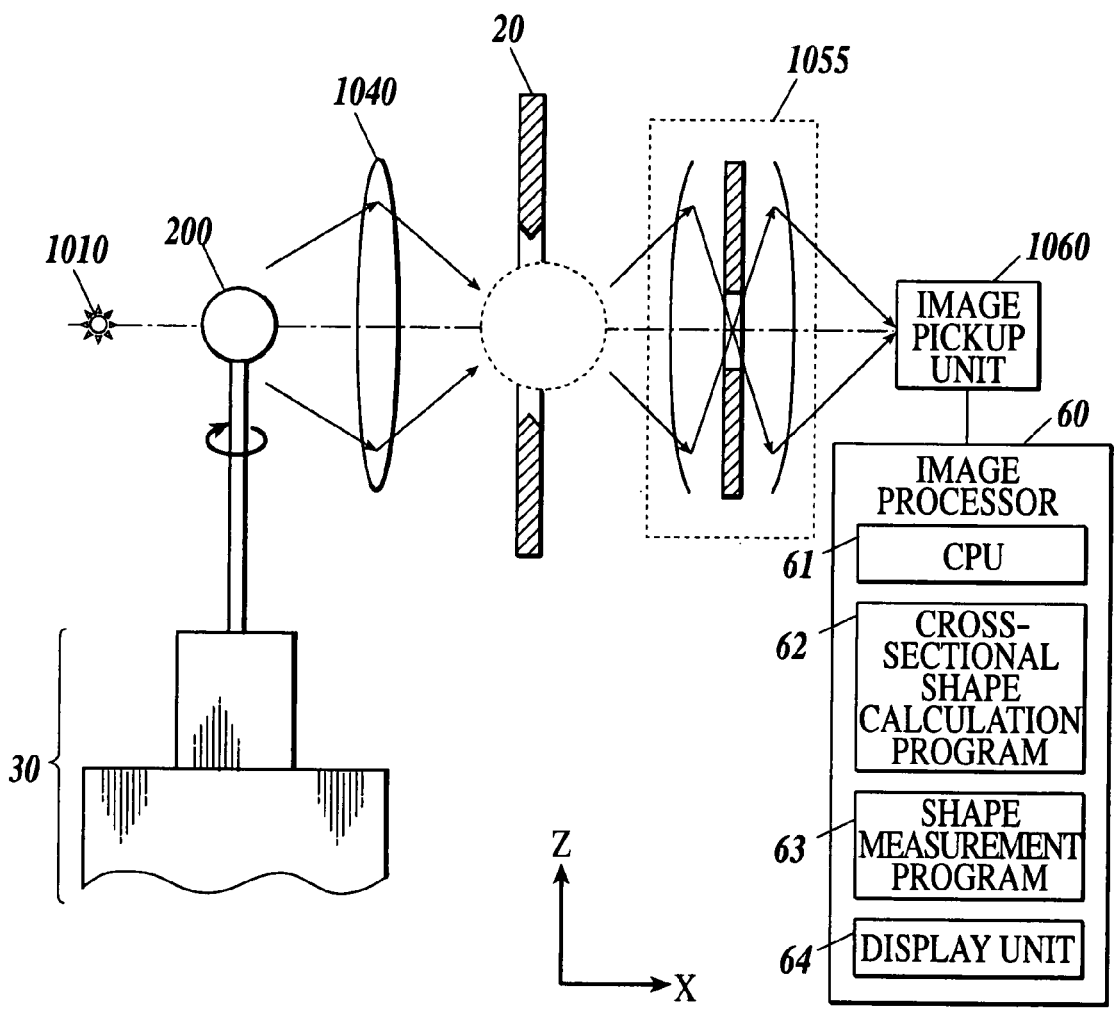
FIG. 11 is a schematic view illustrating the structure of a shape measurement apparatus in Embodiment 5 according to the present invention.

Next, Embodiment 5 of the shape measurement apparatus of the present invention will be described with reference to FIG. 11. The basic structure of Embodiment 5 is the same as that of Embodiment 3. However, the structure of Embodiment 5 is different from Embodiment 3 in that the second lens is a telecentric lens 1055.

According to the structure as described above, by the telecentric lens 1055, it is possible to reduce the light diffraction caused by irradiating the object 200 to be measured and by the light passing through the aperture 20. Therefore, a more preferred shape measurement can be performed.

In Embodiment 5, a method for measuring the shape of the object 200 to be measured by the shape measurement apparatus 1300 is the same as that of Embodiment 3.

Embodiment 6

Figure 12:
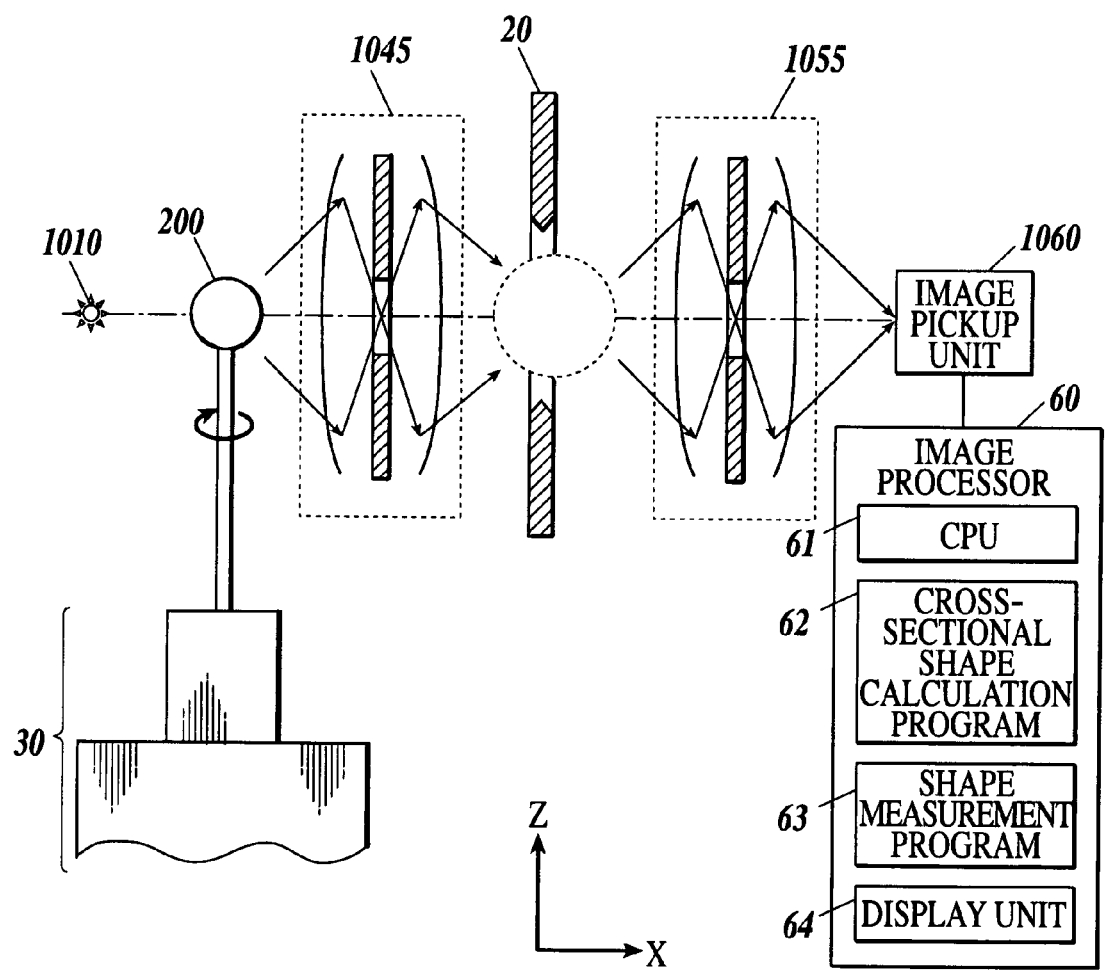
FIG. 12 is a schematic view illustrating the structure of a shape measurement apparatus in Embodiment 6 according to the present invention.

Next, Embodiment 6 of the shape measurement apparatus of the present invention will be described with reference to FIG. 12. The basic structure of Embodiment 6 is the same as that of Embodiment 3. However, the structure of Embodiment 6 is different from Embodiment 3 in that the first lens and the second lens are telecentric lenses 1045 and 1055, respectively.

According to the structure as described above, by the telecentric lenses 1045 and 1055, like Embodiment 4, it is possible to suppress a change in the magnification ratio due to the shift of the position of the object to be measured. Furthermore, when the object to be measured is rotated by the rotating mechanism, a change in the size of the image due to the shift of the position caused by a kinematic error can be suppressed. Furthermore, like Embodiment 5, it is possible to reduce the light diffraction caused by irradiating the object to be measured and by the light passing through the aperture. Therefore, a more preferable shape measurement can be performed.

In Embodiment 6, a method for measuring the shape of the object 200 to be measured by the shape measurement apparatus 1400 is the same as that of Embodiment 3.

Embodiment 7

Figure 13:
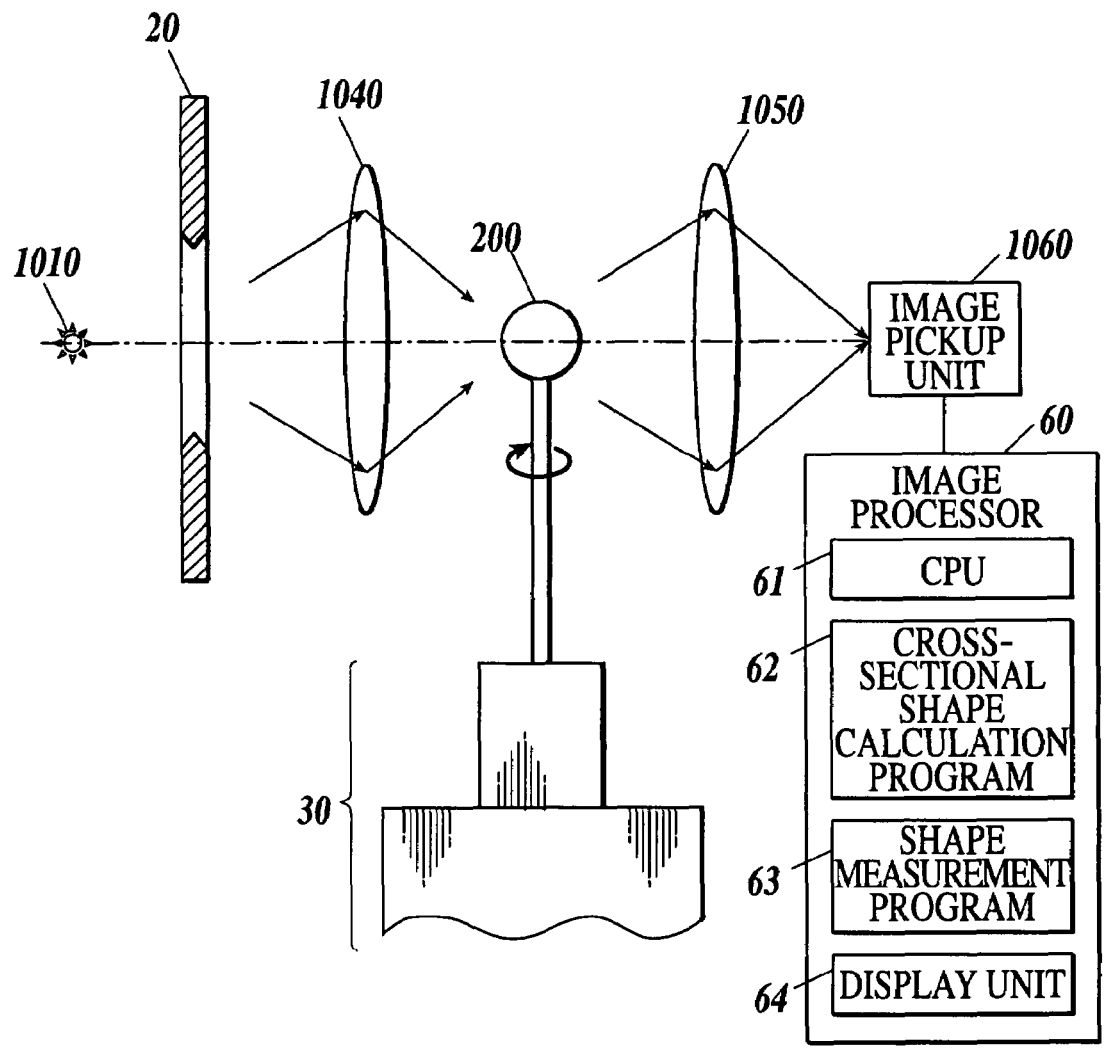
FIG. 13 is a schematic view illustrating the structure of a shape measurement apparatus in Embodiment 7 according to the present invention.

Next, Embodiment 7 of the shape measurement apparatus of the present invention will be described with reference to FIG. 13. In the basic structure of Embodiment 7, as shown in FIG. 13, the light source unit 1010, the aperture 20, the rotating mechanism 30, an objective lens 1040 as the first lens, an objective lens 1050 as the second lens, an image pickup unit 1060, and an image processor 60 are provided. Along the optical axis of light outputted from the light source unit 1010, the aperture 20, the objective lens 1040, the object 200 to be measured, the objective lens 1050, and the image pickup unit 1060 are arranged in this order.

According to the structure as described above, by the light intensity distribution of the taken circle of light, it is possible to detect the edge of the object to be measured. Thus, the shape of the object to be measured can be easily and efficiently measured. Furthermore, the shape can be measured without depending on a distance between the object to be measured and the aperture. Therefore, it is possible to preferably prevent a physical interference between the object to be measured and the aperture. Furthermore, the size of an image of the object to be measured is set by the magnification ratio of the second lens. Therefore, the freedom of the diameter of the opening of the aperture can be proportionally increased.

Furthermore, by disposing the aperture 20 on the side of the light source unit 1010 with respect to the object 200 to be measured, it is possible to prevent the light outputted from the light source unit 1010 from being diffused when the object to be measured is irradiated. It is possible to increase the efficiency of using the light outputted from the light source unit 1010.

Furthermore, a method for measuring the shape of the object 200 to be measured by the shape measurement apparatus 1500 in Embodiment 7 is the same as that of Embodiment 3.

It is noted that the present invention is not limited to the above embodiments. The object to be measured may be a rotating symmetric body and also may have a circular cylindrical shape or a conical shape. Further, each of the above shape measurement apparatus can calculate a cross-sectional shape in an entire surface of the rotating symmetric body, such as a circular cylindrical shape or a conical shape, that is, can calculate the three dimensional shape (variation) of the rotating symmetric body.

Alternatively, a measurement value obtained by calculating one cross-sectional shape of an object to be measured also may be fed back to a processing apparatus of the object to be measured. In this case, the object to be measured can be processed and the shape thereof can be measured in an efficient manner.

Furthermore, other detailed structures or the like also can be appropriately changed.

In accordance with the first aspect of the preferred embodiments of the present invention, a shape measurement method for measuring a shape of an object to be measured, which has a substantially rotating symmetric shape, comprises:

placing an aperture having an opening larger than an outer shape of the object to be measured and the object to be measured on an optical axis;

taking an image generated by light projected to the object to be measured, by using an image pickup unit; and calculating one cross-sectional shape of the object to be measured based on a light intensity distribution of the image taken by the image pickup unit.

According to the first aspect of the preferred embodiments of the present invention, an aperture having an opening larger than an outer shape of an object to be measured and the object to be measured are placed on the optical axis. Further, by an image pickup unit it is possible to take a circle of light, which is obtained around one cross-sectional shape of the object to be measured. Based on the light intensity distribution of the circle of light, one cross-sectional shape of the object to be measured can be calculated.

Therefore, it is possible to suppress light diffraction. Further, based on the light intensity distribution of the taken circle of light, it is possible to detect the edge of the object to be measured. Thus, the shape of the object to be measured can be easily and efficiently measured.

Preferably, a magnifying lens for magnifying the image is provided between the aperture or the object to be measured and an image pickup plane of the image pickup unit to take the image.

In this case, a magnifying lens can be provided between the aperture or the object to be measured and an image pickup plane of the image pickup unit.

Thus, an image can be taken via the magnifying lens. Further, even when an object to be measured is very small, the shape can be easily and efficiently measured.

Preferably, a telecentric lens is provided between the aperture or the object to be measured and an image pickup plane of the image pickup unit to take the image.

In this case, a telecentric lens can be provided between the aperture or the object to be measured and an image pickup plane of the image pickup unit.

Thus, among light emitted from the light source, only the light parallel to the optical axis can be used to form an image. Thus, an error in the size of the image can be suppressed. Further, it is possible to reduce the light diffraction.

Preferably, the light is diffused light.

In this case, the diffused light can be used to illuminate the object to be measured.

Thus, the light diffraction can be less conspicuous. Thus, the shape of the object to be measured can be easily and efficiently measured.

Preferably, the light is collimated light.

In this case, the collimated light can be used to illuminate the object to be measured.

Thus, because the light emitted from the light source can be collected as collimated light, the entire diffraction pattern is bright and the contrast becomes higher. Further, a treatable diffraction pattern having a diffraction spread angle smaller than that of a point light source can be obtained.

In accordance with the second aspect of the preferred embodiments of the present invention, a shape measurement method for measuring a shape of an object to be measured, which has a substantially rotating symmetric shape, comprises:

placing the object to be measured, a first lens, an aperture which has an opening larger than an outer shape of the object to be measured and which is disposed at an imaging position of the first lens, and a second lens between a light source unit and an image pickup plane of an image pickup unit, on an optical axis in an order of the object to be measured, the first lens, the aperture and the second lens from the light source unit;

taking an image generated by light projected from the light source unit to the object to be measured, by using the image pickup unit; and calculating one cross-sectional shape of the object to be measured based on a light intensity distribution of the image taken by the image pickup unit.

According to the second aspect of the preferred embodiments of the present invention, the object to be measured, a first lens, an aperture which has an opening larger than an outer shape of the object to be measured and which is disposed at an imaging position of the first lens, and a second lens are placed between the light source unit and the image pickup plane of the image pickup unit on the optical axis in this order from the light source side.

Thus, by the light intensity distribution of the taken circle of light, it is possible to detect the edge of the object to be measured. Thus, the shape of the object to be measured can be easily and efficiently measured. Furthermore, the shape can be measured without depending on a distance between the object to be measured and the aperture. Therefore, it is possible to preferably prevent a physical interference between the object to be measured and the aperture. Furthermore, the size of an image of the object to be measured is set by the magnification ratio of the first lens. Therefore, the freedom of the diameter of the opening of the aperture can be proportionally increased.

In accordance with the third aspect of the preferred embodiments of the present invention, a shape measurement method for measuring a shape of an object to be measured, which has a substantially rotating symmetric shape, comprises:

placing an aperture having an opening larger than an outer shape of the object to be measured, a first lens, the object to be measured which is disposed at an imaging position of the first lens, and a second lens between a light source unit and an image pickup plane of an image pickup unit, on an optical axis in an order of the aperture, the first lens, the object to be measured and the second lens from the light source unit;

taking an image generated by light projected from the light source unit to the object to be measured, by using the image pickup unit; and calculating one cross-sectional shape of the object to be measured based on a light intensity distribution of the image taken by the image pickup unit.

According to the third aspect of the preferred embodiments of the present invention, an aperture having an opening larger than an outer shape of the object to be measured, a first lens, the object to be measured which is disposed at an imaging position of the first lens, and a second lens between a light source unit and an image pickup plane of an image pickup unit are placed between the light source unit and the image pickup plane of the image pickup unit on the optical axis in this order from the light source.

Thus, by the light intensity distribution of the taken circle of light, it is possible to detect the edge of the object to be measured. Thus, the shape of the object to be measured can be easily and efficiently measured. Furthermore, the shape can be measured without depending on a distance between the object to be measured and the aperture. Therefore, it is possible to preferably prevent a physical interference between the object to be measured and the aperture. Furthermore, the size of an image of the object to be measured is set by the magnification ratio of the second lens. Therefore, the freedom of the diameter of the opening of the aperture can be proportionally increased.

Furthermore, by disposing the aperture on the side of the light source unit with respect to the object to be measured, it is possible to prevent the light outputted from the light source unit from being diffused when the object to be measured is irradiated. It is possible to increase an efficiency of using the light outputted from the light source unit.

Preferably, the first lens and/or the second lens are/is a telecentric lens unit.

In this case, the first lens and/or the second lens can be a telecentric lens unit.

Thus, by using the telecentric lens, an aperture stop is disposed at the focal point of the lens. By reducing the diameter of the aperture, much light from the object to be measured is blocked by the aperture stop. After the light forming an image enters the lens from the object to be measured in a direction substantially parallel to the optical axis, only light passing the focal point through the aperture stop is not blocked. Because an image is formed by using only the substantially collimated light from the object to be measured, the variation in the magnification ratio due to a change in the position of the object to be measured is small.

Therefore, it is possible to suppress a change in the magnification ratio due to the shift of the position of the object to be measured. Further, it is possible to reduce light diffraction.

Preferably, a diameter of the opening of the aperture, which is suitable for the object to be measured is selected by changing a magnification ratio of the first lens and/or a magnification ratio of the second lens.

In this case, by changing a magnification ratio of the first lens and/or a magnification ratio of the second lens, it is possible to select a diameter of the opening of the aperture suitable for the object to be measured.

Thus, by changing the magnification ratio of the lens, it is possible to adjust the diameter of an opening of the aperture. Therefore, it is not required to prepare an aperture in accordance with the size of the object to be measured case by case. Thus, the shape can be easily and efficiently measured.

Preferably, the shape measurement method further comprises:

rotating the object to be measured by a predetermined angle; and calculating a cross-sectional shape in an entire surface of the object to be measured, by alternately repeating the calculating of the one cross-sectional shape of the object to be measured and the rotating of the object to be measured by a predetermined angle.

In this case, the object to be measured can be rotated by a predetermined angle.

Thus, it is possible to repeat the step of calculating one cross-sectional shape of the object to be measured and the step of rotating the object to be measured by a predetermined angle. Thus, the cross-sectional shape in the entire surface of the object to be measured can be easily and efficiently measured.

Preferably, the object to be measured is a sphere.

In this case, a sphere also can be easily and efficiently measured.

Preferably, in the calculating of the one cross-sectional shape of the sphere, a temporary center of the one cross-sectional shape and a temporary center of the aperture are determined by collecting a light intensity pattern of the image taken by the image pickup unit in an orthogonal coordinate axis system; and an edge of the sphere and an edge of the aperture are detected by detecting an edge of a bright point in a predetermined azimuthal direction when the temporary center of the one cross-sectional shape and the temporary center of the aperture are origins; and a shape of the opening, which is calculated from the detected edge of the aperture is corrected by comparing the shape of the opening, which is calculated from the detected edge of the aperture with a predetermined shape of the opening of the aperture; and the one cross-sectional shape of the sphere is calculated by correcting a shape of the detected edge of the sphere based on an amount of a correction of the shape of the aperture.

In this case, one cross-sectional shape of a sphere can be easily and efficiently measured.

Preferably, a roundness of the one cross-sectional shape of the sphere is calculated based on the calculated one cross-sectional shape of the sphere.

In this case, the roundness of a sphere also can be easily and efficiently measured.

Preferably, the roundness is calculated at a predetermined rotation angle in an entire surface of the sphere and the sphericity of the sphere is calculated based on variation of values of the roundness.

In this case, the sphericity of a sphere also can be easily and efficiently measured.

In accordance with the fourth aspect of the preferred embodiments of the present invention, a shape measurement apparatus for measuring a shape of an object to be measured, which has a substantially rotating symmetric shape, comprises:

a light source unit for projecting light to the object to be measured;

an aperture which is placed on an optical axis of the light emitted from the light source unit and which has an opening larger than an outer shape of the object to be measured;

an image pickup unit for taking an image obtained by projecting the light from the light source to the object to be measured, which is placed on the optical axis; and a cross-sectional shape calculation unit for calculating one cross-sectional shape of the object to be measured based on a light intensity distribution of the image taken by the image pickup unit.

According to the fourth aspect of the preferred embodiments of the present invention, by the light source unit it is possible to project light to the object to be measured. When the light can be projected to the object to be measured, it is possible to suppress the light diffraction by passing through the aperture having an opening larger than the outer shape of the object to be measured. By the image pickup unit, it is possible to take an image obtained by irradiating the object to be measured placed on the optical axis with the light outputted from the light source unit. By the cross-sectional shape calculation unit, it is possible to calculate one cross-sectional shape of the object to be measured based on the light intensity distribution of the taken image.

Therefore, it is possible to suppress the light diffraction. Further, based on the light intensity distribution of the taken circle of light, it is possible to detect the edge of the object to be measured. Thus, the shape of the object to be measured can be easily and efficiently measured.

Preferably, the shape measurement apparatus further comprises:

a magnifying lens for magnifying the image between the aperture or the object to be measured and an image pickup plane of the image pickup unit.

In this case, because a magnifying lens for magnifying the image is provided between the aperture or the object to be measured and an image pickup plane of the image pickup unit, the aperture and the object to be measured and the image pickup plane of the image pickup unit, it is possible to easily and efficiently measure the shape of even a small object to be measured.

Preferably, the shape measurement apparatus further comprises:

a telecentric lens between the aperture or the object to be measured and an image pickup plane of the image pickup unit.

In this case, because a telecentric lens between the aperture or the object to be measured and an image pickup plane of the image pickup unit, it is possible to form an image by using only light parallel to the optical axis among light emitted from the light source. Therefore, an error of the size of the image can be suppressed. Further, it is possible to reduce the light diffraction.

Preferably, the light source unit comprises a diffusing unit for diffusing and outputting the light.

In this case, by the diffusing unit, it is possible to output diffused light.

Thus, the light diffraction can be less conspicuous. Further, the shape of the object to be measured can be easily and efficiently measured.

Preferably, the light source unit comprises a collimation unit for collimating and outputting the light.

In this case, by the collimation unit, it is possible to output collimated light.

Thus, because the light emitted from the light source can be collected as collimated light, it is possible to suppress the decrease of the light intensity and the light diffraction can be less conspicuous. Furthermore, the shape of the object to be measured can be easily and efficiently measured.

In accordance with the fifth aspect of the preferred embodiments of the present invention, a shape measurement apparatus for measuring a shape of an object to be measured, which has a substantially rotating symmetric shape, comprises:

a light source unit for projecting light to the object to be measured;

a first lens and a second lens for passing an image of the object to be measured, which is obtained by the light projected from the light source;

an aperture which is placed at an imaging position between the first lens and the second lens and which has an opening larger than an outer shape of the object to be measured;

an image pickup unit for taking the image passed by the second lens; and a cross-sectional shape calculation unit for calculating one cross-sectional shape of the object to be measured based on a light intensity distribution of the image taken by the image pickup unit.

According to the fifth aspect of the preferred embodiments of the present invention, by the light source unit, it is possible to project light to the object to be measured. The image of the object to be measured, which is obtained by light outputted from the light source unit can pass through the first lens and the second lens. When the light can be projected to the object to be measured, the outline of the object to be measured is taken as an image by passing through the aperture having an opening larger than the outer shape of the object to be measured. By the image pickup unit, the image outputted from the second lens can be taken. By the cross-sectional shape calculation unit, one cross-sectional shape of the object to be measured can be calculated based on the light intensity distribution of the image taken by the image pickup unit.

Therefore, based on the light intensity distribution of the taken circle of light, the edge of the object to be measured can be detected and the shape of the object to be measured can be easily and efficiently measured. Furthermore, the shape can be measured without depending on a distance between the object to be measured and the aperture. Therefore, it is possible to preferably prevent a physical interference between the object to be measured and the aperture. Furthermore, the size of an image of the object to be measured is determined by the magnification ratio of the first lens. Therefore, the freedom of the diameter of the opening of the aperture can be proportionally increased.

In accordance with the sixth aspect of the preferred embodiments of the present invention, a shape measurement apparatus for measuring a shape of an object to be measured, which has a substantially rotating symmetric shape, comprises:

a light source unit for projecting light to the object to be measured;

an aperture which has an opening larger than an outer shape of the object to be measured and which passes the light outputted by the light source unit from the opening;

a first lens and a second lens for passing the light passed by the aperture;

an image pickup unit which is provided on an opposite side of the first lens with respect to the second lens and which takes an image of the object to be measured, which is disposed at an imaging position of the first lens between the first lens and the second lens; and a cross-sectional calculation unit for calculating one cross-sectional shape of the object to be measured based on a light intensity distribution of the image taken by the image pickup unit.

According to the sixth aspect of the preferred embodiments of the present invention, by the light source unit, it is possible to project light to the object to be measured. By the aperture, the light outputted from the light source unit can pass through the opening. The light passing through the aperture can pass through the first lens and the second lens. By the image pickup unit, it is possible to take the image of the object to be measured, which is disposed at an imaging position of the first lens between the first lens and the second lens.

Therefore, based on the light intensity distribution of the taken circle of light, the edge of the object to be measured can be detected and the shape of the object to be measured can be easily and efficiently measured. Furthermore, the shape can be measured without depending on a distance between the object to be measured and the aperture. Therefore, it is possible to preferably prevent a physical interference between the object to be measured and the aperture. Furthermore, the size of an image of the object to be measured is determined by the magnification ratio of the second lens. Therefore, the freedom of the diameter of the opening of the aperture can be proportionally increased.

Furthermore, the position of the object to be measured and the position of the aperture are exchanged. When the object to be measured is irradiated with the light outputted from the light source unit, it is possible to prevent the light diffusion. Therefore, it is possible to increase the efficiency of using the light outputted from the light source unit.

Preferably, the first lens and/or the second lens are/is a telecentric lens unit.

In this case, the first lens and/or the second lens can be a telecentric lens unit.

Thus, by using the telecentric lens, an aperture stop is disposed at the focal point of the lens. By reducing the diameter of the aperture, much light from the object to be measured is blocked by the aperture stop. After the light forming an image enters the lens from the object to be measured in a direction substantially parallel to the optical axis, only light passing the focal point through the aperture stop is not blocked. Because an image is formed by using only the substantially collimated light from the object to be measured, the variation in the magnification ratio due to a change in the position of the object to be measured is small.

Therefore, it is possible to suppress a change in the magnification ratio due to the shift of the position of the object to be measured. Further, it is possible to reduce light diffraction.

Preferably, a diameter of the opening of the aperture, which is suitable for the object to be measured is selected by changing a magnification ratio of the first lens and/or a magnification ratio of the second lens.

In this case, by changing a magnification ratio of the first lens and/or a magnification ratio of the second lens, it is possible to select a diameter of the opening of the aperture suitable for the object to be measured.

Thus, by changing the magnification ratio of the lens, it is possible to adjust the diameter of an opening of the aperture. Therefore, it is not required to prepare an aperture in accordance with the size of the object to be measured case by case. Thus, the shape can be easily and efficiently measured.

Preferably, the shape measurement apparatus further comprises:

a rotation unit for rotating the object to be measured by a predetermined angle; and a shape measurement unit for calculating the one cross-sectional shape of the object to be measured whenever the rotation unit rotates the object to be measured by a predetermined angle, and for calculating a cross-sectional shape in an entire surface of the object to be measured.

In this case, by the rotation unit, it is possible to rotate the object to be measured by a predetermined angle. Whenever the object to be measured is rotated by a predetermined angle by the rotation unit, one cross-sectional shape of the object to be measured can be calculated by the cross-sectional shape calculation unit and the cross-sectional shape in the entire surface of the object to be measured can be calculated by the shape measurement unit.

Thus, it is possible to repeat the step of calculating one cross-sectional shape of the object to be measured and the step of rotating the object to be measured by a predetermined angle. Thus, the cross-sectional shape in the entire surface of the object to be measured can be easily and efficiently measured.

Preferably, the object to be measured is a sphere.

In this case, a sphere also can be easily and efficiently measured.

The entire disclosure of Japanese Patent Applications No. 2006-253976 and No. 2006-253983 filed on Sep. 20, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A shape measurement method for measuring a shape of an object to be measured, which has a substantially rotating symmetric shape, comprising:

placing an aperture having an opening larger than an outer shape of the object to be measured and the object to be measured on an optical axis;

taking an image generated by light projected to the object to be measured, by using an image pickup unit; and calculating one cross-sectional shape of the object to be measured based on a light intensity distribution of the image taken by the image pickup unit, wherein in the calculating, a shape of the opening of the aperture is compared with a shape of an opening of an image of the aperture, and the one cross-sectional shape of the object to be measured is calculated by correcting the shape of the image of the object to be measured based on a result of a comparison between the shape of the opening of the aperture and the shape of the opening of the image of the aperture.

2. The shape measurement method as claimed in claim 1, wherein: a magnifying lens for magnifying the image is provided between the aperture or the object to be measured and an image pickup plane of the image pickup unit to take the image.

3. The shape measurement method as claimed in claim 1, wherein: a telecentric lens is provided between the aperture or the object to be measured and an image pickup plane of the image pickup unit to take the image.

4. The shape measurement method as claimed in claim 1, wherein: the light is diffused light.

5. The shape measurement method as claimed in claim 1, wherein: the light is collimated light.

6. A shape measurement method for measuring a shape of an object to be measured, which has a substantially rotating symmetric shape, comprising:
placing the object to be measured, a first lens, an aperture which has an opening and which is disposed at an imaging position of the first lens, and a second lens between a light source unit and an image pickup plane of an image pickup unit, on an optical axis in an order of the object to be measured, the first lens, the aperture and the second lens from the light source unit;
taking an image generated by light projected from the light source unit to the object to be measured, by using the image pickup unit; and
calculating one cross-sectional shape of the object to be measured based on a light intensity distribution of the image taken by the image pickup unit,
wherein a diameter of the opening of the aperture, which is suitable for the object to be measured is selected so that the opening of the aperture is larger than an outer shape of an image of the object to be measured or so that an opening of an image of the aperture is larger than an outer shape of the object to be measured, by changing a magnification ratio of the first lens and/or a magnification ratio of the second lens.

7. A shape measurement method for measuring a shape of an object to be measured, which has a substantially rotating symmetric shape, comprising:
placing an aperture having an opening, a first lens, the object to be measured which is disposed at an imaging position of the first lens, and a second lens between a light source unit and an image pickup plane of an image pickup unit, on an optical axis in an order of the aperture, the first lens, the object to be measured and the second lens from the light source unit;
taking an image generated by light projected from the light source unit to the object to be measured, by using the image pickup unit; and calculating one cross-sectional shape of the object to be measured based on a light intensity distribution of the image taken by the image pickup unit,
wherein a diameter of the opening of the aperture, which is suitable for the object to be measured is selected so that the opening of the aperture is larger than an outer shape of an image of the object to be measured or so that an opening of an image of the aperture is larger than an outer shape of the object to be measured, by changing a magnification ratio of the first lens and/or a magnification ratio of the second lens.

8. The shape measurement method as claimed in claim 6, wherein:
the first lens and/or the second lens are/is a telecentric lens unit.

9. The shape measurement method as claimed in claim 1, further comprising:
rotating the object to be measured by a predetermined angle; and
calculating a cross-sectional shape in an entire surface of the object to be measured, by alternately repeating the calculating of the one cross-sectional shape of the object to be measured and the rotating of the object to be measured by a predetermined angle.

10. The shape measurement method as claimed in claim 1, wherein: the object to be measured is a sphere.

11. The shape measurement method as claimed in claim 10, wherein:
in the calculating of the one cross-sectional shape of the sphere,
a temporary center of the one cross-sectional shape and a temporary center of the aperture are determined by collecting a light intensity pattern of the image taken by the image pickup unit in an orthogonal coordinate axis system; and an edge of the sphere and an edge of the aperture are detected by detecting an edge of a bright point in a predetermined azimuthal direction when the temporary center of the one cross-sectional shape and the temporary center of the aperture are origins; and
a shape of the opening, which is calculated from the detected edge of the aperture is corrected by comparing the shape of the opening, which is calculated from the detected edge of the aperture with a predetermined shape of the opening of the aperture; and the one cross-sectional shape of the sphere is calculated by correcting a shape of the detected edge of the sphere based on an amount of a correction of the shape of the aperture.

12. The shape measurement method as claimed in claim 11, wherein:
a roundness of the one cross-sectional shape of the sphere is calculated based on the calculated one cross-sectional shape of the sphere.

13. The shape measurement method as claimed in claim 12, wherein: the roundness is calculated at a predetermined rotation angle in an entire surface of the sphere and the sphericity of the sphere is calculated based on variation of values of the roundness.

14. A shape measurement apparatus for measuring a shape of an object to be measured, which has a substantially rotating symmetric shape, comprising:
a light source unit for projecting light to the object to be measured;
an aperture which is placed on an optical axis of the light outputted from the light source unit and which has an opening larger than an outer shape of the object to be measured;
an image pickup unit for taking an image obtained by projecting the light from the light source to the object to be measured, which is placed on the optical axis; and
a cross-sectional shape calculation unit for calculating one cross-sectional shape of the object to be measured based on a light intensity distribution of the image taken by the image pickup unit,
wherein in the cross-sectional shape calculation unit, a shape of the opening of the aperture is compared with a shape of an opening of an image of the aperture, and the one cross-sectional shape of the object to be measured is calculated by correcting the shape of the image of the object to be measured based on a result of a comparison between the shape of the opening of the aperture and the shape of the opening of the image of the aperture.

15. The shape measurement apparatus as claimed in claim 14, further comprising:
a magnifying lens for magnifying the image between the aperture or the object to be measured and an image pickup plane of the image pickup unit.

16. The shape measurement apparatus as claimed in claim 14, further comprising:
a telecentric lens between the aperture or the object to be measured and an image pickup plane of the image pickup unit.

17. The shape measurement apparatus as claimed in claim 14, wherein: the light source unit comprises a diffusing unit for diffusing and outputting the light.

18. The shape measurement apparatus as claimed in claim 14, wherein: the light source unit comprises a collimation unit for collimating and outputting the light.

19. A shape measurement apparatus for measuring a shape of an object to be measured, which has a substantially rotating symmetric shape, comprising:
- a light source unit for projecting light to the object to be measured;
- a first lens and a second lens for passing an image of the object to be measured, which is obtained by the light projected from the light source;
- an aperture which is placed at an imaging position between the first lens and the second lens and which has an opening;
- an image pickup unit for taking the image passed by the second lens; and
a cross-sectional shape calculation unit for calculating one cross-sectional shape of the object to be measured based on a light intensity distribution of the image taken by the image pickup unit,
- wherein a diameter of the opening of the aperture, which is suitable for the object to be measured is selected so that the opening of the aperture is larger than an outer shape of an image of the object to be measured or so that an opening of an image of the aperture is larger than an outer shape of the object to be measured, by changing a magnification ratio of the first lens and/or a magnification ratio of the second lens.

20. A shape measurement apparatus for measuring a shape of an object to be measured, which has a substantially rotating symmetric shape, comprising:
- a light source unit for projecting light to the object to be measured;
- an aperture which has an opening and which passes the light outputted by the light source unit from the opening;
- a first lens and a second lens for passing the light passed by the aperture;
- an image pickup unit which is provided on an opposite side of the first lens with respect to the second lens and which takes an image of the object to be measured, which is disposed at an imaging position of the first lens between the first lens and the second lens; and
- a cross-sectional calculation unit for calculating one cross-sectional shape of the object to be measured based on a light intensity distribution of the image taken by the image pickup unit,
- wherein a diameter of the opening of the aperture, which is suitable for the object to be measured is selected so that the opening of the aperture is larger than an outer shape of an image of the object to be measured or so that an opening of an image of the aperture is larger than an outer shape of the object to be measured, by changing a magnification ratio of the first lens and/or a magnification ratio of the second lens.

21. The shape measurement apparatus as claimed in claim 19, wherein:
the first lens and/or the second lens are/is a telecentric lens unit.

22. The shape measurement apparatus as claimed in claim 14, further comprising:
- a rotation unit for rotating the object to be measured by a predetermined angle; and
- a shape measurement unit for calculating the one cross-sectional shape of the object to be measured whenever the rotation unit rotates the object to be measured by a predetermined angle, and for calculating a cross-sectional shape in an entire surface of the object to be measured.

23. The shape measurement apparatus as claimed in claim 14, wherein: the object to be measured is a sphere.

* * * * *